Sept. 1, 1964     D. SINCLAIR ETAL     3,146,619
PROCESS AND APPARATUS FOR TESTING BRAKES
Filed Aug. 22, 1962     10 Sheets-Sheet 3
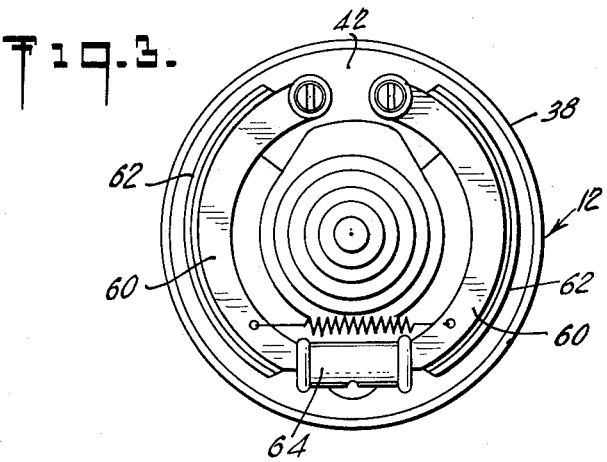
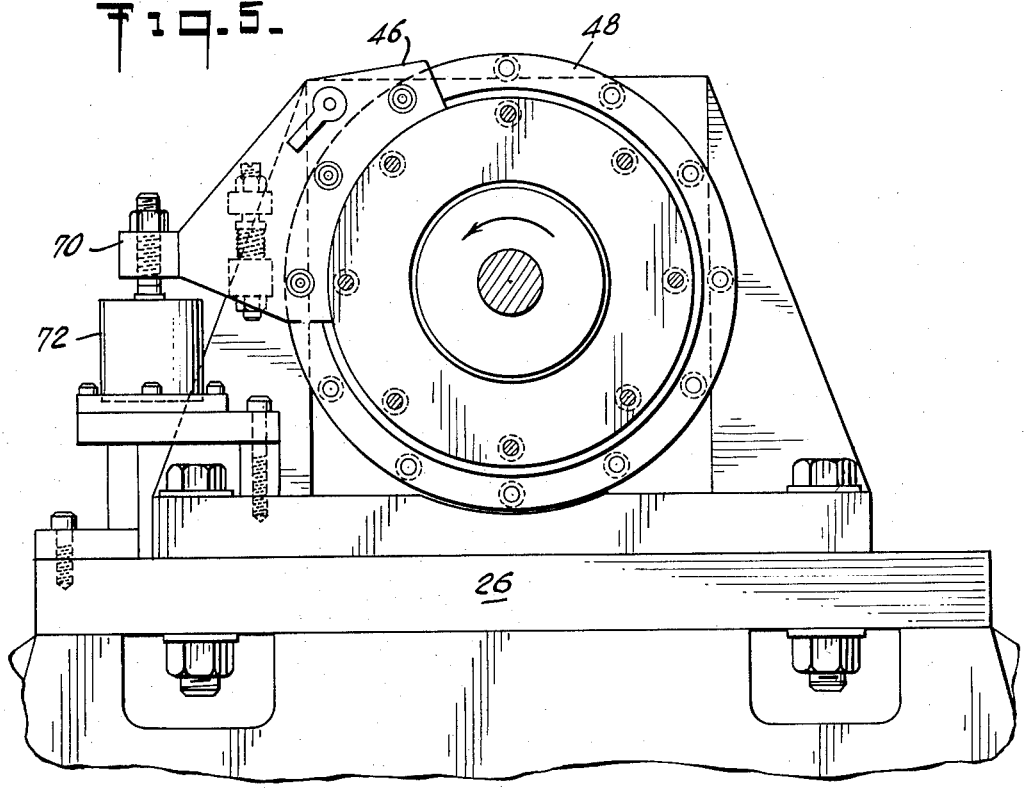
INVENTORS
DAVID SINCLAIR
WALTER F. GULICK
BY John A. McKinney
ATTORNEY

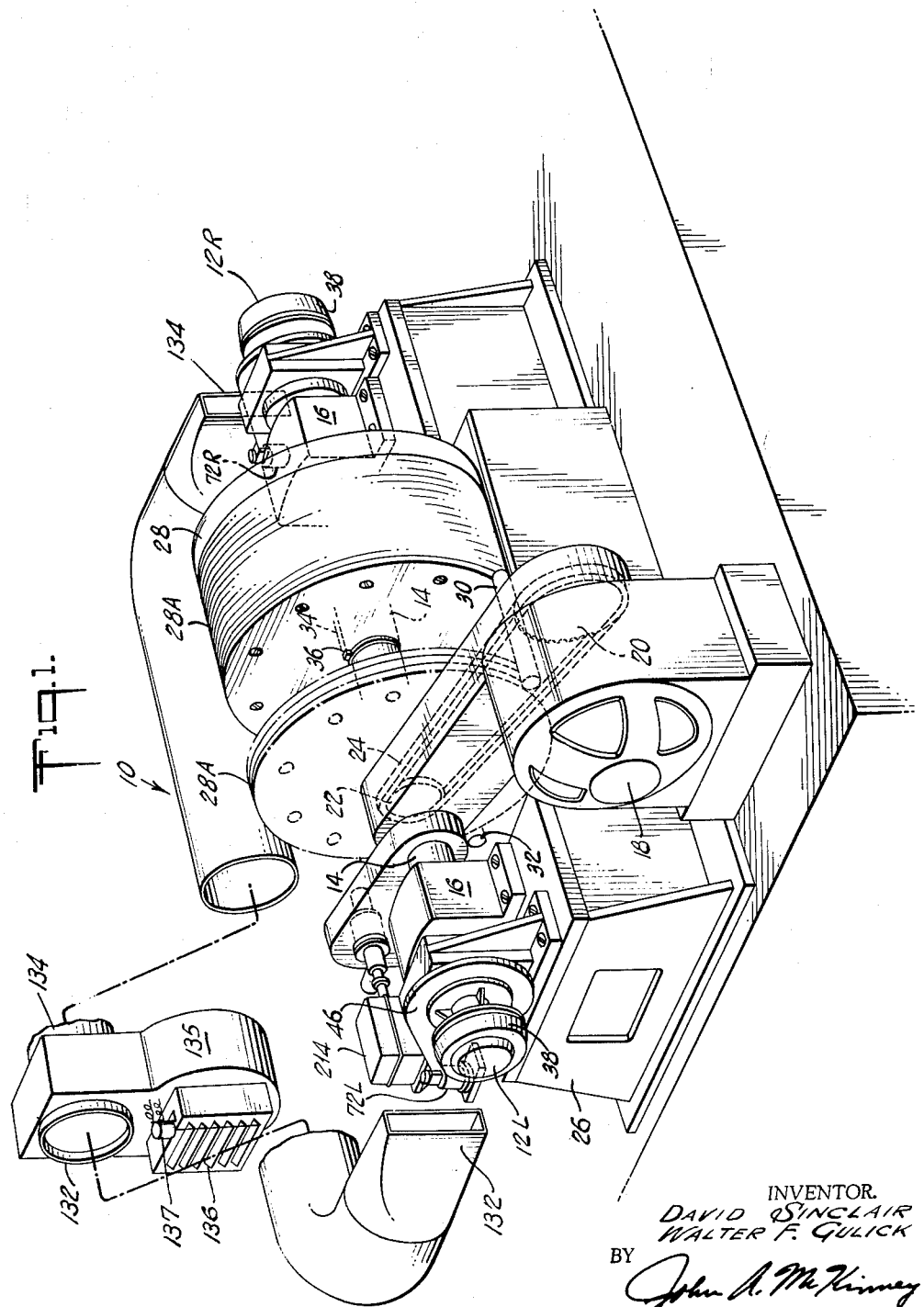

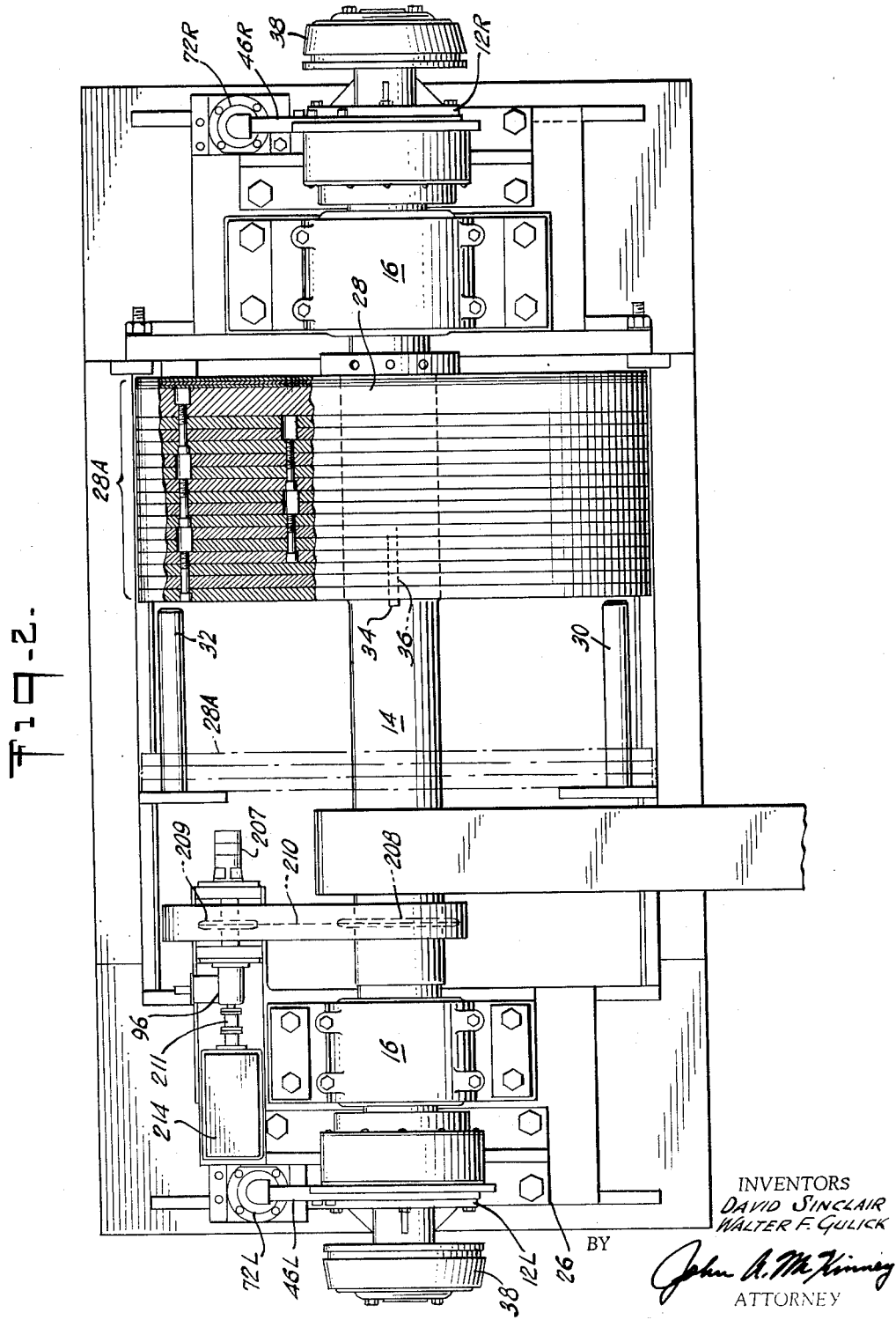

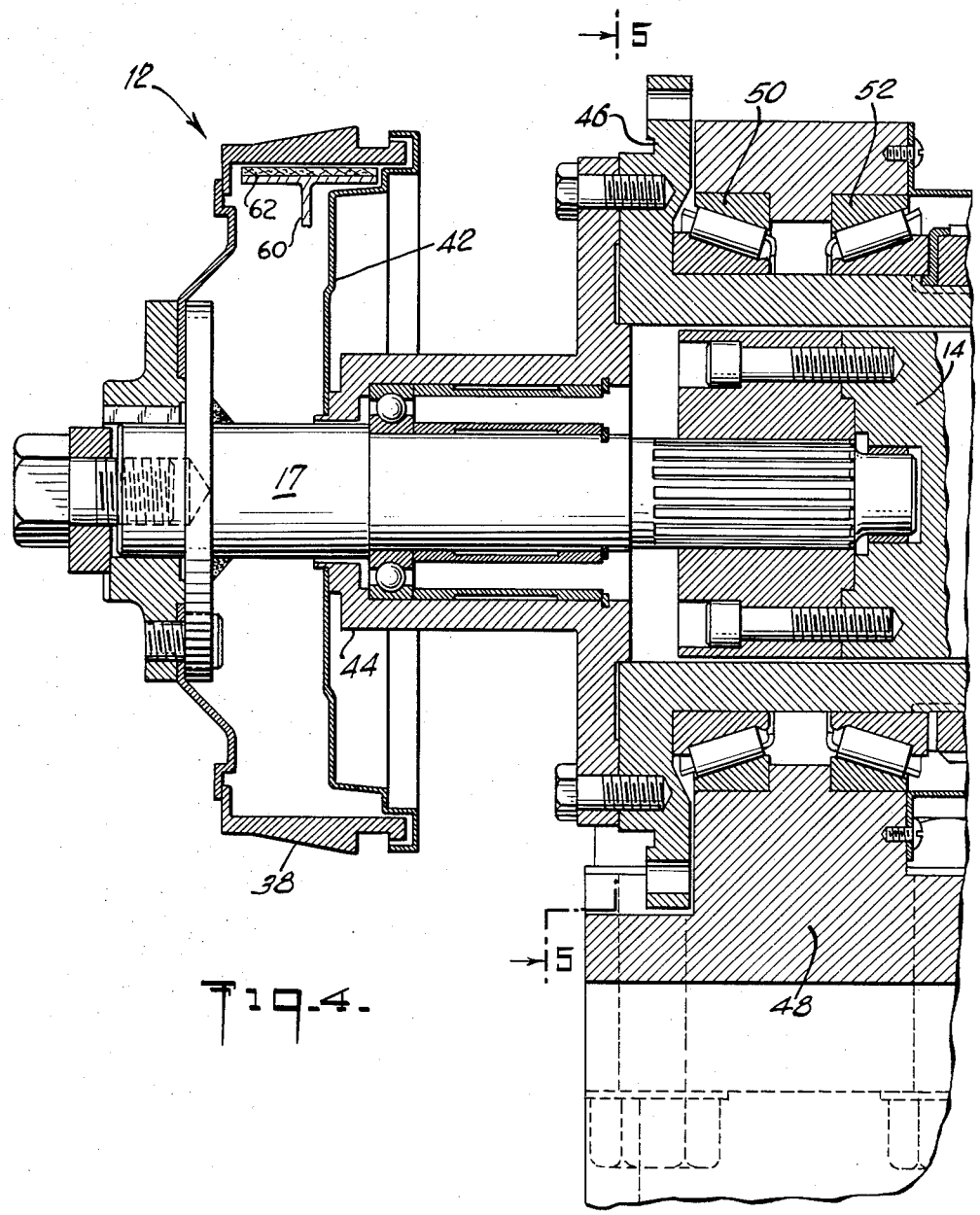

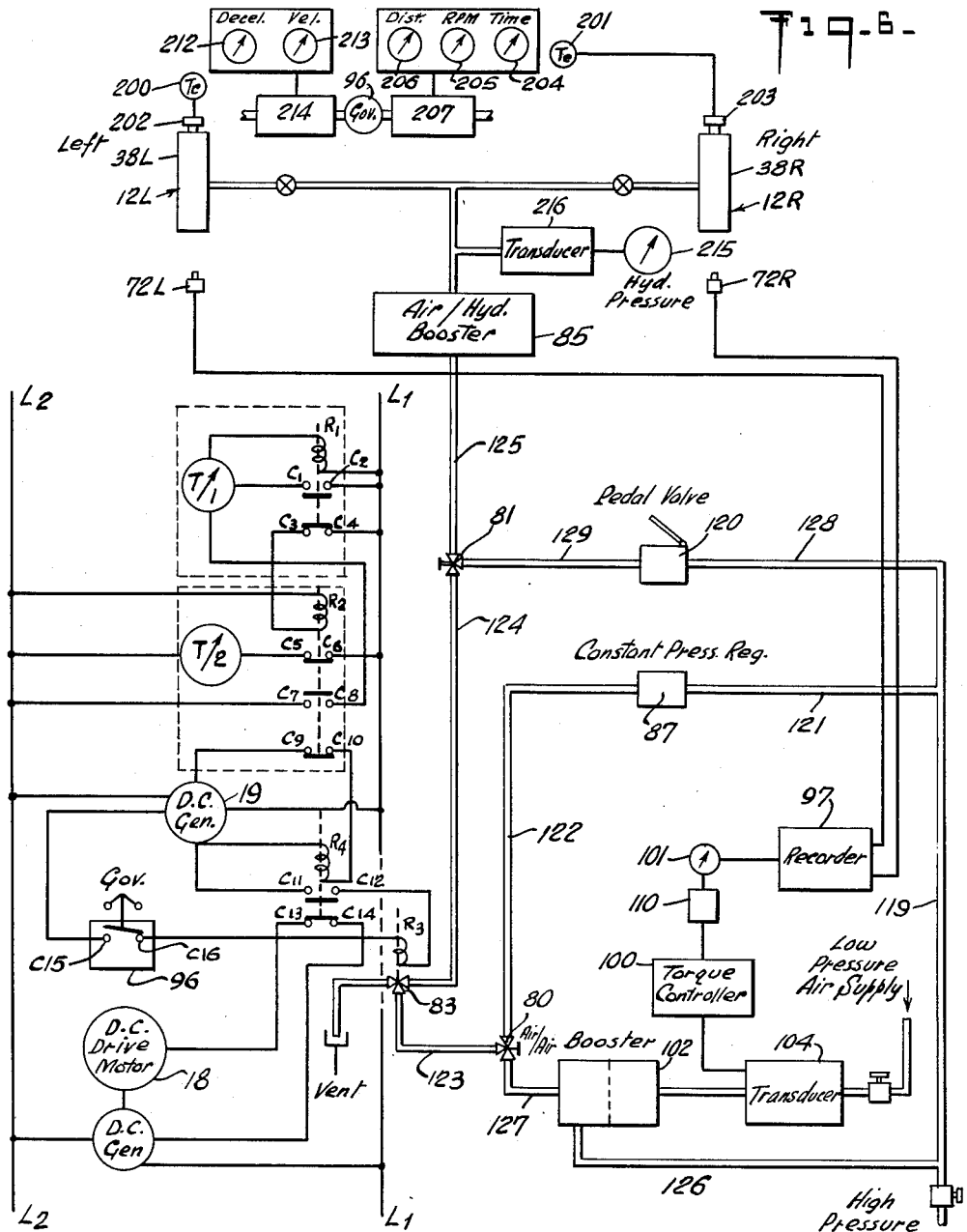

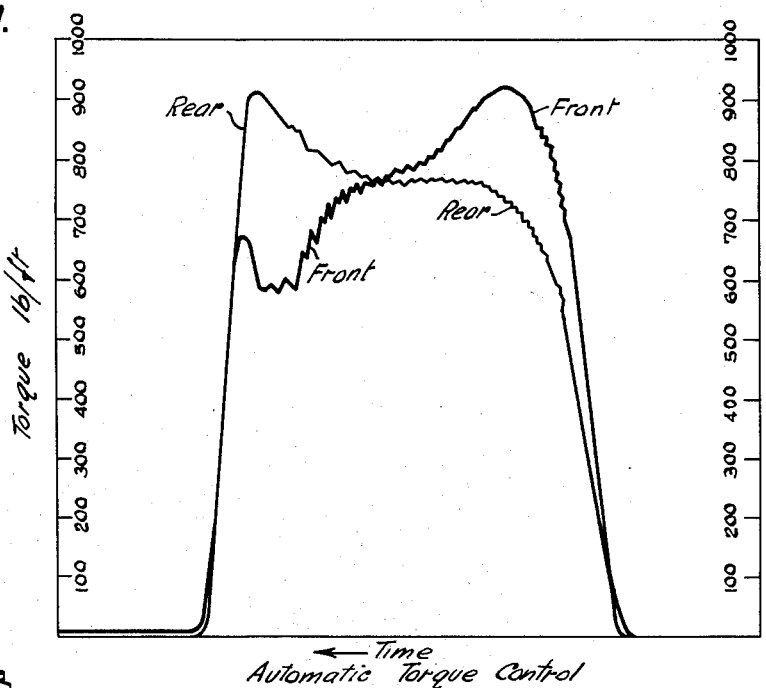
Fig. 7. Automatic Torque Control
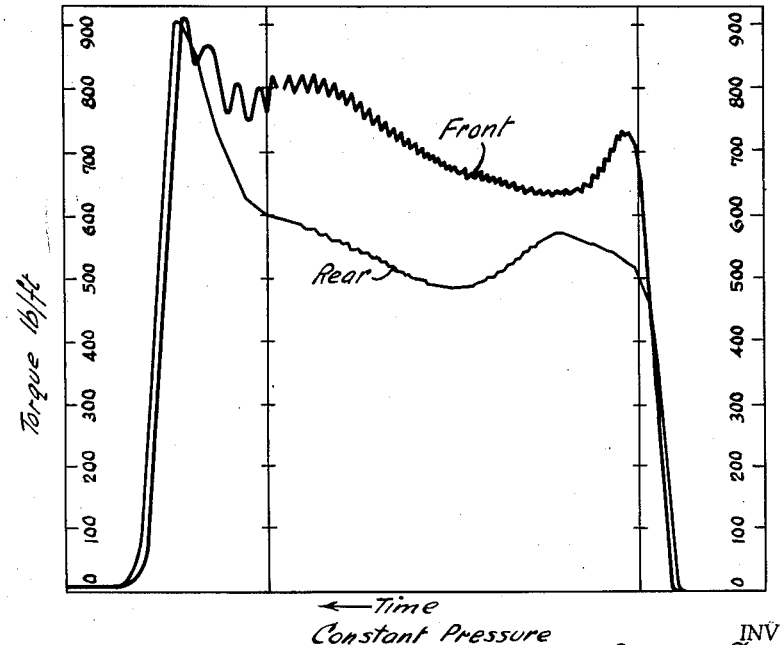
Fig. 8. Constant Pressure

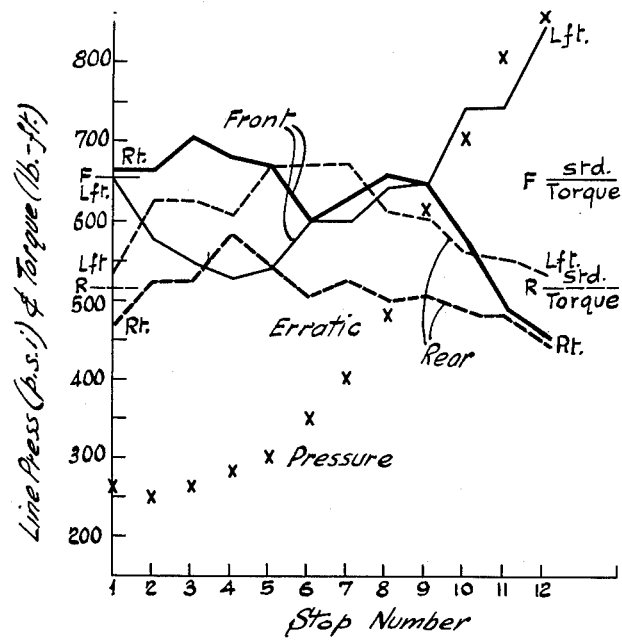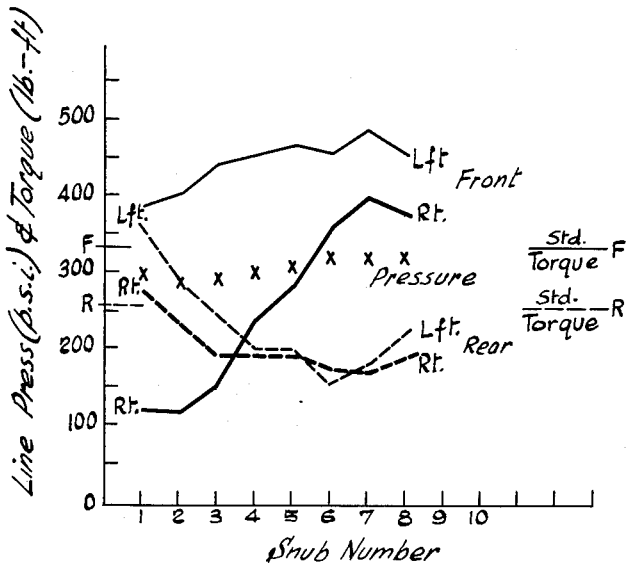

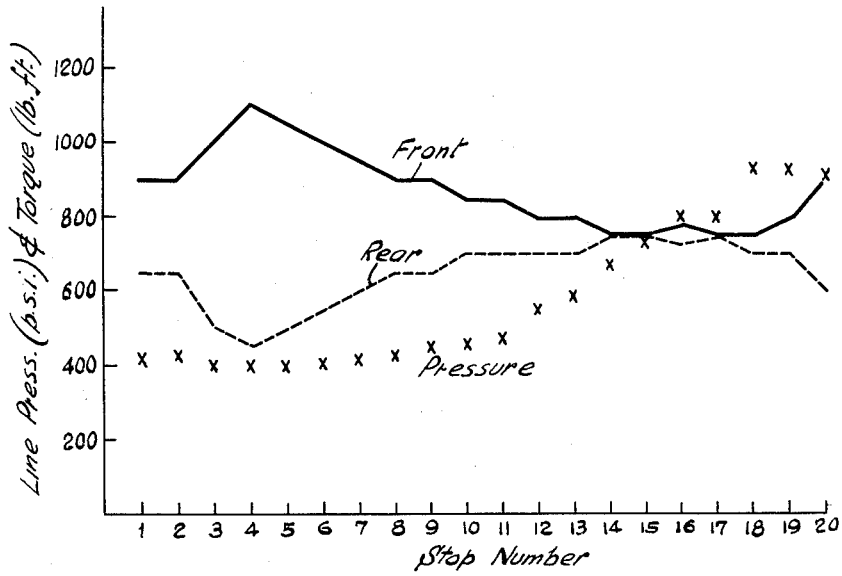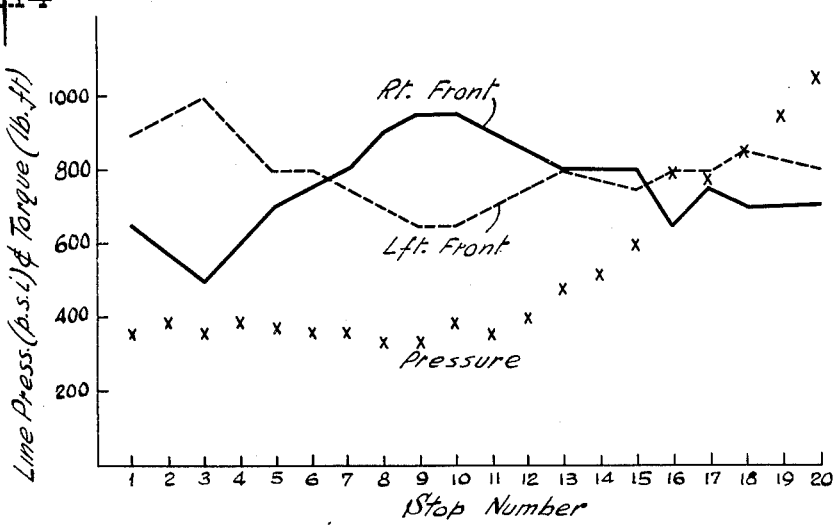

INVENTORS
DAVID SINCLAIR
WALTER F. GULICK
BY John A. McKinney
ATTORNEY

3,146,619
PROCESS AND APPARATUS FOR TESTING BRAKES
David Sinclair, Martinsville, and Walter F. Gulick, Neshanic Station, N.J., assignors to Johns-Manville Corporation, New York, N.Y., a corporation of New York
Filed Aug. 22, 1962, Ser. No. 218,690
21 Claims. (Cl. 73—121)

This invention generally relates to a dynamometer for determining the effectiveness of various brakes and brake linings, particularly vehicular.

More particularly this invention relates to method and apparatus for simultaneously measuring the effectiveness of a plurality of brakes or brake lining sets used in braking a common moving mass.

Improvement of the correlation between road and dynamometer tests is a continuous problem for the automobile, brake and brake lining manufacturers. These manufacturers are continuously striving not only to provide improved correlation but also to obtain method and apparatus which will provide more reproducible and reliable brake performance data than that obtainable with road car tests.

Heretofore, the standard brake dynamometers have been capable of testing only one brake at a time. Thus, many of the deficiencies in the operation of vehicle brakes which are manifested on road tests could not be duplicated on the dynamometer tests. For example, it has been impossible to determine the distribution of front and rear braking, or the distribution between sets of brakes, i.e., a pair of front wheel or a pair of rear wheel brakes, on the standard single-brake dynamometer. It is the random nature of torque transfer among the multiple brakes of a vehicle that makes it impossible to duplicate the braking cycle of any one brake on a single-brake dynamomoter. Torque transfer is not unknown, however, its effect has not been appreciated. Torque transfer is responsible for erratics such as right-left pull which can readily be detected by a driver. Tests indicate that torque transfer occurs to a much greater extent between the front and rear brakes than between right and left brakes, primarily because of the designed difference in effectiveness. However, this front to rear torque transfer cannot be detected by the driver until skidding occurs, and then the skidding is usually ascribed to weight-shift to the front wheels.

Brake-temperature measurements have been employed to show the general trend of torque transfer. However, such measurements only indicate when the torque transfer is severe and at best are relatively inaccurate and unreliable. They show erratic variations which sometimes may be attributed to drum distortion and brake lining swelling. Furthermore, the heat capacity of the brake will materially influence the response of temperature sensing means and cause a lag in the response.

Torque measurements provide an accurate means for evaluating individual brakes, but are very difficult and time consuming when made on a vehicle road test. The various gauges, such as strain, thermocouple, etc., which must be mounted on the brake shoes or anchor pins of a road test vehicle are subject to overstrain, burnout, etc. and usually require more space than is available. Furthermore, it is not possible to mount the strain gauges, which are normally employed to measure torque, on some types of brakes such as the center-plane type, while on the vehicle. With a dynamometer, the brake torque can be measured directly with instruments, whereas in a vehicle the brake torque must be usually calculated from many factors such as wheel loading, deceleration, initial speed, and required stopping distance. In slides or skids, the brake torque is contingent upon such extremely variable factors as the friction between the tire and the road.

A further problem is the inaccuracy of the speedometers and decelerometers commonly employed in test vehicles. Normally special equipment mounted in a fifth wheel and special calibration are required.

Furthermore, vehicle tests introduce several random variables such as inter alia, wind, ambient temperatures, humidity, dust, vehicle tilt, wheel-to-road rolling resistance, and windage. Such variables are extraneous to the performance of the brakes, brake linings, etc., and require special tests to determine their effects and/or extra tests to average their effects.

It is accordingly a principal object of this invention to provide method and apparatus adapted to simultaneously (1) test a plurality of brake units and (2) measure the individual torques of the plurality of brake units acting upon a common moving mass.

It is another object of this invention to provide method and apparatus adapted to simultaneously measure the individual torques of a plurality of brake units coupled to the same mass.

It is still a further object to provide method and apparatus for controlling the operation of a dynamometer measuring a plurality of torque test loads exerted between and generated by a common rotating mass and braking forces applied to the mass.

In carrying out the invention in one form, a shaft is provided, which shaft carries a flywheel whose inertia can be adjusted to simulate one-half the weight of a car or any other preselected condition. A wheel, with brake drum and corresponding brake inside, is mounted on each end of the shaft. The brake shoes and backing plate of each brake unit are preferably restrained by a torque arm which compresses a measuring load cell to measure the braking torque of each respective brake unit separately. The individual torques are recorded on a multiple pen direct-writing recorder. The recorder is preferably of the type that may transmit a signal representing the sum of the individual torques to a torque controller, which controller compares the sum with a preselected point and adjusts the braking force accordingly to maintain substantially constant torque when desired. Indicating meters are also provided for reading the individual brake temperatures as measured by the respective thermocouples positioned in the lining of each brake. Other indicators may also be provided to indicate the elapsed time, r.p.m., and the total revolutions during a desired interval. These various indicators are preferably actuated by an alternating current generator type tachometer. In addition, indicating meters for velocity and deceleration are also provided. These meters are both preferably actuated by a direct current tachometer. Optionally, air flow means including an automatic damper, may be provided to simulate test-car temperature conditions by maintaining an air flow proportional to the speed of rotation.

Means are provided to selectively actuate the brakes:
(1) At constant pressure during a predetermined automatic time cycle, but without control of deceleration to simulate test car operations made at constant pressure; or
(2) Under automatic torque control to simulate the deceleration cycle used in test car operations.

Alternatively, the dynamometer may be operated manually, such as by means of a foot brake pedal, as in a car. However, the automatic control provides more readily reproducible results and requires less operator attention.

Referring to the drawings in which like characters are used to designate the same or similar parts throughout the several figures of the drawings:

FIG. 1 is a pictorial view illustrating the dynamometer of this invention;

FIG. 2 is a plan view of the dynamometer shown in FIG. 1;

FIG. 3 is a cross-sectional elevational view of a brake unit, including a brake drum together with one form of brake shoe and actuating mechanism typical of that employed in automotive vehicles;

FIG. 4 is an enlarged cross-sectional elevational view of one end of the drive shaft of FIG. 1 showing in detail the corresponding torque arm connection;

FIG. 5 is an end elevational view taken along lines 5—5 of FIG. 4 illustrating the application of torque to the torque measuring device;

FIG. 6 is a schematic circuit diagram illustrating operative hydraulic and electrical circuits which may be employed in connection with the dynamometer of this invention;

FIG. 7 is a view of a chart made on the torque recorder showing the torque transfer that took place during a single stop test made on the dynamometer of this invention with the automatic torque controller in operation, between the right front and left rear brakes from an automobile;

FIG. 8 is a view similar to FIG. 7 but of a chart made during a stop at constant pressure without automatic torque control;

FIG. 9 is a chart illustrating the results of a series of fade stops made from 60 m.p.h. (nominal) at 13 ft./sec.$^2$ braking deceleration during a first evaluation of a lining on a test car;

FIG. 11 is a chart illustrating the first evaluation of torque obtained during a series of recovery snub tests made on the same lining as evaluated in FIGS. 9 and 10;

FIG. 13 is a chart illustrating the results of a series of fade stops made from 50 m.p.h. at 18 ft./sec.$^2$ braking deceleration of the right front and left rear brake linings of a car during an evaluation made on the dynamometer of this invention;

FIG. 14 is a chart similar to FIG. 13 illustrating the results during an evaluation made on the dynamometer of this invention of the two front brake linings of the same car as evaluated in FIG. 13;

FIG. 16 is a chart illustrating the torque transfer during a first evaluation of the right front and left rear brake linings from 60 m.p.h. at 15 ft./sec.$^2$ made on the dynamometer of this invention.

Figure 10:
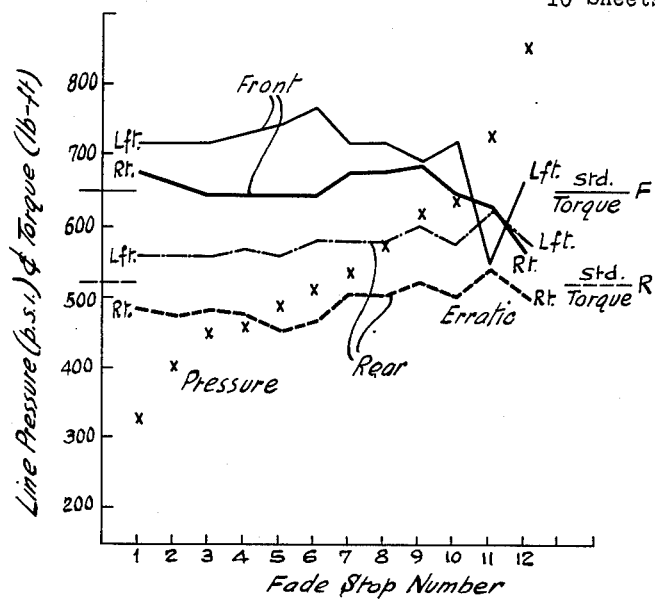
FIG. 10 is a chart similar to FIG. 9 illustrating the results during a second evaluation of the fade stops of the same lining as evaluated in FIG. 9.

In FIG. 1 the dynamometer is designated generally by the numeral 10 and for purposes of illustration is shown in operative engagement with a pair of automotive brake units 12 mounted to brake rotatable shaft 14, one brake unit being designated as 12L and the other being designated as 12R. The brake units 12L and 12R may correspond to a left and a right brake unit of either the front or rear wheels of a vehicle, or to a front and a rear wheel by selection of the corresponding brake drum and linings. In many vehicles the front to rear wheel-cylinder area ratio is 1.27:1. Shaft 14 is journalled in bearings 16 and is illustrated as being driven by driving means in the form of motor 18, sprockets 20 and 22, and chain 24. The bearings 16 are supported by test stand base 26 which base is also adapted to support other units of the dynamometer. Master flywheel 28 is mounted for rotation with shaft 14. Additional segmental flywheel weights 28A and also cradled about shaft 14. When in the storage position the weights 28A are supported by means of support elements 30 and 32. Shaft 14 is provided with key 34 to engage corresponding key slots 36 of weights 28A when it is desired to provide additional weights to simulate a moving mass greater than the master flywheel 28. Usually, sufficient weights are used to simulate one-half the weight of the car for which the brake linings being tested are designed.

Referring to FIG. 4, each of the braking units 12 comprises a backing plate 42, positioned adjacent to the open end of brake drum 38, and secured to mounting adapter member 44 which in turn is secured to torque recording carrier member 46 rotatably mounted in torque member mounting support 48 through cone roller bearings 50 and 52. Support 48 is secured to base member 26 by suitable means such as bolts and nuts. The braking unit 12 also houses the brake shoes 60 and corresponding brake linings 62, which shoes and linings are to be tested. The shoes 60 may be mounted to backing plate 42 by means of the usual medium and for actuation by well-known hydraulic piston means 64. An example of one form of brake shoes and linings and means of attaching to the backing plate 42 is illustrated in FIG. 3.

Drum 38 is preferably detachably mounted on stub shaft 17 splined to and projecting laterally from shaft 14. This arrangement facilitates change-over mounting of the braking units 12, i.e., brake drums, backing plates, and brake shoes of one type or particular vehicle to those of another type or vehicle.

Rotation of member 46 and the other components secured thereto, upon braking of drum 38 is restrained by torque arm 70 coupled to braking torque measuring device 72 illustrated in FIG. 5 as a load cell which may be in the form of a commercially available type known as Baldwin Load Cell SR4 Type C. It is within the contemplation of this invention that other torque measuring devices may be employed so long as separate measurements are taken for the individual braking units. Such strain gauges employ small electrical resistance elements bonded to an element which expands under pressure to stretch the resistance elements. Stretch increases the electrical resistance proportionally to the strain. The change in resistance is employed to correspondingly vary the current emitted to the automatic pen recorder 97 shown in FIG. 6 which graphically indicates the separate braking torques exerted at each brake drum 38.

Temperature indicating meters 200 and 201 (FIG. 6) are provided to indicate the temperature of the brakes as sensed by thermocouples 202 and 203 suitably mounted in the linings of each of the brake units 12. Dial indicators 204, 205 and 206 are provided for indicating the elapsed time, revolutions per minute, and the number of revolutions, respectively, during any desired period. The dial 206 may be in the form of an odometer to indicate directly the corresponding linear distance. The indicators 204, 205 and 206 are actuated by an alternating current generator-type tachometer 207 suitably coupled to drive shaft 14 as by means such as sprockets 208 and 209, chain 210 and shaft 211. Also provided are indicating meters 212 and 213 for indicating deceleration and velocity respectively. These meters 212 and 213 are actuated by a direct current tachometer 214 coupled to shaft 14 in a manner similar to that of tachometer 207. The deceleration values are obtained by differentiation of the tachometer 214 voltage. A counter, not shown, may also be provided to indicate the number of stops made in a test or series of tests. An indicator 215 is also provided in connection with the hydraulic system to indicate the hydraulic pressure as sensed and transmitted by transducer 216.

FIG. 6 illustrates the schematic circuit for applying, measuring and recording the individual torques at the separate brake units. As shown in FIG. 6, alternating current is provided to direct current motor-generator set 18, timers $T_1$ and $T_2$ from lines $L_1$ and $L_2$. In order to protect the particular relays and instruments employed in the apparatus built, direct current was supplied from direct current generator 19 to relays $R_3$ and $R_4$ and their corresponding contacts. However, it will be apparent that other types of circuits and controls can be employed without departing from the spirit of this invention.

As indicated previously, the circuit may be selectively adjusted to actuate the brakes in three different modes: (1) automatically at constant pressure; (2) automatically at constant total torque; and (3) manually.

When the brakes are automatically actuated under constant pressure, three-way solenoid valve 83 is positioned to admit air to the air/hydraulic booster 85 according to a time cycle to be later described. The solenoid valve 83 is normally positioned to be open to the vent position. Air from a suitable source, at preferably 100 p.s.i., is transmitted through branch lines 119 and 121 to constant pressure regulator 87, through branch line 122 and three-way valve 80, line 123, valve 83, line 124, valve 81 and line 125 to the air/hydraulic booster 85 to exert pressure upon the hydraulic system which actuates the brakes. As the brakes are actuated after the brake drums 38 are brought up to the desired speed, electrical signals representing the individual torques as measured by the load cells 72L and 72R are transmitted to the multiple pen recorder 97 where the values are graphically recorded. As the drums 38 are brought to a stop, the electrical contacts $C_{15}$ and $C_{16}$ of the governor 96 are closed and solenoid valve 83 is energized to the vent position. FIG. 8 illustrates the recorder chart taken from an actual test showing the torque transfer that occurred during a single stop between the right front and left rear brakes of a car tested at constant pressure-no torque control conditions.

If it is desired to actuate the brakes automatically under substantially constant torque control conditions, three-way valves 80 and 81 are suitably positioned to cause the high pressure air to flow through line 126, air/air booster 102, lines 127 and 123, valve 83, lines 124 and 125, to air/hydraulic booster 85. The torque controller 100 is selectively set through selector 101 at a preferred index point representing the total torque desired to be exerted by the brakes. As timer $T_2$ runs out, solenoid valve 83 is actuated, air is transmitted to the air/hydraulic booster 85 and consequently the brakes are actuated. Individual signals representing the torques exerted at the separate brake drums 38L and 38R are transmitted to recorder 97. In turn a signal representing the sum of the individual torques is transmitted to torque controller 100 for comparison with the preset index point. If there is a difference between the preferred set point of selector 101 and the actual torque sum, the controller 100 through transducer 104 will transmit a signal to booster 102. The air supply is accordingly adjusted through the circuit until the total torque exerted is in fixed relation, preferably matching, with the set point. As the drums 38 are brought to a stop, solenoid valve 83 is actuated to the vent position.

In order to reduce the control time required for the torque controller 100, a standard set point summarizing unit, comprising the torque controller 100, was modified to the extent of providing an electrical relay 110 which "locks" the system when a preselected maximum deviation from the set point is reached at the time the brake drums are completely stopped. In this particular case the electrical relay 110 was substituted for the manual control unit normally provided with the commercially available summarizer. The actual maximum deviation occurs when the shaft 14 is completely stopped and the torque is zero. However, before the shaft 14 comes to a complete stop and when the signal representing the sum of the torque reaches a predetermined minimum the relay 110 cuts in and holds the condition existing in the torque controller unit at that particular level. Thus when the shaft is again rotated the torque controller 100 will not operate until the locked level of differential existing in the torque controller unit is exceeded. This feature is important in that it considerably reduces the control time, the time required by the controller to adjust the circuit so that the actual torque will correspond to the preselected level.

The operation of the timing mechanism employed in connection with the dynamometer of this invention will now be described in more detail and with reference to FIG. 6 and with the assumption that the operational test is to take place with automatic torque control.

Starting with the shaft 14 and flywheel 28 in the stop position, the electrical contacts of governor 96 are open, relay $R_3$ is de-energized and three-way valve 83 is positioned to vent the air which is normally fed to booster 85 for actuating the brakes through the hydraulic system leading from booster 85. A stop timer T–1, is incorporated in the circuit and is set to suit the time interval required to brake the rotating shaft 14. Preferably, the set time exceeds, by a short interval, the actual time required. As the timer T–1, runs out, coil $R_1$ is de-energized to open the contacts $C_1$ and $C_2$ and close contacts $C_3$ and $C_4$. Closing of contacts $C_3$ and $C_4$ energizes coil $R_2$ to close contacts $C_5$ and $C_6$ and actuates running timer T–2. The set time for timer T–2 is that required to bring the shaft up to running speed. Simultaneously, contacts $C_7$ and $C_8$ open and the breaking of the circuit through timer T–1, by virtue of its internal circuit, causes timer T–1 to reset itself to the start position. Also simultaneously, contacts $C_{11}$ and $C_{12}$ are opened, contacts $C_9$ and $C_{10}$ are closed to energize coil $R_4$ and close contacts $C_{13}$ and $C_{14}$. The closing of contacts $C_{13}$ and $C_{14}$ starts the drive motor 18. As the rotational speed of motor 18 reaches that set on governor 96, the governor contacts $C_{15}$ and $C_{16}$ are closed. Then when timer T–2 runs out, contacts $C_7$ and $C_8$ are closed and timer T–1 starts. Contacts $C_9$ and $C_{10}$ are opened and coil $R_4$ is de-energized to close contacts $C_{11}$ and $C_{12}$ and open contacts $C_{13}$ and $C_{14}$. Coil $R_3$ is then energized and actuates valve 83 to the position where air is admitted to booster 85 and hence the brakes are actuated. Then as the shaft is stopped the above-described cycle is repeated.

The operator of the testing unit may also operate the dynamometer manually by positioning valve 81 to permit the high pressure air to flow through line 128, foot pedal 120, lines 129 and 125 and hence to air/hydraulic booster 85 and actuating the foot pedal 120 in the same manner as in a road test car and as required to maintain the desired constant conditions as indicated by the appropriate instruments. During a constant pressure series of tests the operator actuates foot pedal 120 to maintain the pressure constant as visually indicated by dial 215. During a constant torque series of tests the operator actuates the foot pedal 120 to maintain a constant rate of deceleration as indicated by dial 212.

FIG. 1 also discloses cooling air ducts 132 and 134 and a blower fan 135 which may be independently driven or coupled to shaft 14, in a manner to maintain the air flow proportional to the rotational speed of shaft 14. Adjustable damper 136 may be provided to control the air flow into the intake of fan 135 and to simulate test car temperature conditions at the brake drums 38, which conditions vary from one type of brake to another and from one type of car to another. The adjustment of damper 136 may be actuated by control 137 receiving electrical impulses from a tachometer driven from shaft 14 corresponding to the relative rotational speed.

Brake evaluation tests have been conducted using the dynamometer and automatic torque controller of this invention and these tests have disclosed the brake effort distribution between the front and rear brakes and between a pair of brakes corresponding to either the front or the rear pairs. Prior to this invention, it was considered that such evaluation could only be made on the vehicle (SAE Transaction, volume 61, page 342, 1953) since the available dynamometers were only capable of testing one brake at a time.

These tests indiacte that generally some torque transfer occurs under all circumstances. When the coefficient of friction decreases with increasing temperature, a condition known as "fade," torque tends to oscillate back and forth between the brakes. This causes the temperature of the brakes to oscillate between high and low values, which in turn causes an increased oscillation of the friction, etc. The resulting temperature cycle has a harmful effect on the wear and life of both the lining and the drum, very different from that of steadier temperature conditions, lying between the two extremes, which occurs in single brake dynamometer tests.

Some linings may show an increase in friction with increasing temperature, a condition which is referred to as "anti-fade." Even a moderate amount of anti-fade causes a build-up of torque on the brake whose temperature is increased first. The result is that this brake soon becomes overloaded to destruction unless a fade condition develops. These results show that a lining having uniform, moderate fade is the most desirable, since the ideal, a lining and drum having no fade, which condition would maintain the braking torques in perfect balance, is impossible in actual practice.

FIGS. 9, 10, 11 and 12 are charts which graphically illustrate the variety of torque transfer that occurred during tests conducted on a test car. The torque measurements were made with strain gauges cemented at the heel of the secondary shoe in each of the four brakes from the car tested. The brakes, with attached gauges, were calibrated, one at a time, on a single brake dynamometer to determine the strain gauge output corresponding to a given torque. The strain gauge output was found to be proportional to the torque calculated from the recorded deceleration and the known moment of inertia. The brakes were then mounted on the car and the several evaluation tests run.

FIG. 9 shows the results from a series of fade stops from 60 m.p.h. (nominal) at 13 ft./sec.$^2$ braking deceleration during the first evaluation of a lining. The ordinates are torque in lb.-ft. and the abscissas are the stop number. A representative point was chosen from the recorder chart, similar to that shown in FIG. 7 but from tests made on a car, near the middle of each stop. The ordinates marked standard torque, F and R, show the torque that would be exerted by the front and rear brakes if the coefficient of friction and self-actuation were the same in each brake. The total torque required to slow the car at 13 ft./sec.$^2$ is $2F+2R=2340$ lb.-ft. calculated from the weight of the car plus the equipment, 5130 lbs. and the rolling radius, 1.15 ft.

Marked torque transfer occurred throughout the entire series, noted "erratic" by the driver. A nearly four-fold loss of effectiveness of the four brakes taken together is shown by the substantially four-fold increase in line pressure. This resulted from an approximate 50 percent decrease in the coefficient of friction between lining and drum magnified by self-actuation. The right front brake faded most severely and the left front brake became heavily overloaded.

FIG. 10 shows the results of the second evaluation of the same lining as tested in FIG. 9. In FIG. 10, the fade stops show relatively little torque transfer until the tenth stop when severe fade set in, noted "erratic" by the driver.

FIG. 11 shows the torque transfer during recovery snubs from 30 m.p.h. (nominal) at 6½ ft./sec.$^2$ braking deceleration. The ordinates are torque in lb.-ft. and the abscissas are the snub numbers. The right front brake recovered. The left front brake remained overloaded, possibly from some mechanical difference. The driver noted this series "straight" in spite of the net torque transfer from left to right.

Figure 12:
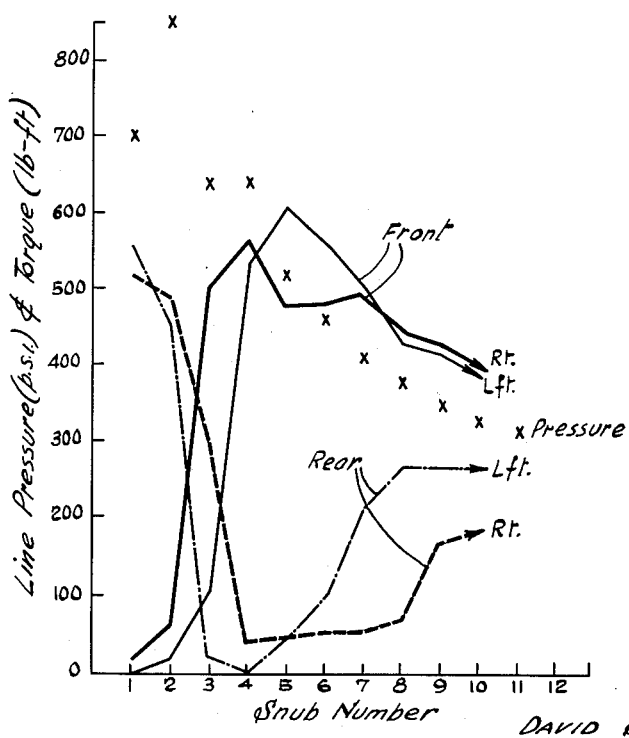
FIG. 12 is a chart similar to FIG. 10 illustrating the second evaluation of recovery snub tests made on the same lining as evaluated in FIGS. 9, 10 and 11.

FIG. 12 shows the results of the second evaluation of the same lining as in FIG. 11. In FIG. 12, the first recovery snub show that both front brakes were faded out completely, so that the rear brakes did all of the work. In the fourth recovery snub this condition was completely reversed. Because the total right and left torque happened to be nearly equal, the entire recovery test was noted "straight" by the driver. The driver was unaware of the complete transfer of torque between front and rear brakes. Skidding did not occur at the low deceleration.

None of the above-referred to effects can occur in a single dynamometer test but they are real effects that have been frequently observed in test cars and during tests with the dynamometer of the instant invention.

FIG. 13 illustrates the torque transfer between the right front and left rear brakes during one of these tests according to the following procedure, arbitrarily designated as Procedure C, when the fade stops were made from 50 m.p.h. at 18 ft./sec.$^2$. The ordinates are the torque in lb.-ft. and the abscissas are the stop members. A representative point was chosen from each of a series of recorder charts, such as shown in FIG. 7, near the middle of each stop.

Procedure C (1) Break-in.
    (*a*) 150 stops from 40 m.p.h. at 10–12 ft./sec.$^2$ at 1 mile intervals.
    (*b*) 150 stops from 50 m.p.h. at 10–12 ft./sec.$^2$ at 1.2 mile intervals.
    (*c*) 75 stops from 50 m.p.h. alternating 12 and 15 ft./sec.$^2$ at 1.2 mile intervals. Inspect brakes and continue if necessary until 90 percent contact is obtained.
(2) Test. Make several normal brake stops to normalize brakes before starting tests.
    (*a*) 30 m.p.h. effectiveness—start with brakes at ambient temperature. Make first stop at 100 p.s.i. line pressure and successive stops increasing in 100 p.s.i. increments, until skid occurs, or when maximum line pressure (approximately 1400 p.s.i.) is reached in dynamometer test. Cool 2 miles at 40 m.p.h. between each stop.
    (*b*) 40 m.p.h. check stops at 15 ft./sec.$^2$ with brakes at ambient temperature. Make 3 or 4 stops and obtain average.
    (*c*) 60 m.p.h. effectiveness—start with brakes at ambient temperature. Make first stop at 100 p.s.i. line pressure and successive stops increasing in 100 p.s.i. increments until skid occurs. Cool 5 miles at 40 m.p.h. between stops.
    (*d*) 80 m.p.h. effectiveness—start with brakes at ambient temperature. Make first stop at 100 p.s.i. line pressure and successive stops increasing in 100 p.s.i. increments until skid occurs. Cool 7½ miles at 40 m.p.h. between stops.
    (*e*) 70 m.p.h. fade. Starting with brakes at ambient temperature, makes 6 stops at 18 ft./sec.$^2$ or until line pressure reaches 1400 p.s.i. or pedal goes to floor board. Interval between brake applications is 25 seconds on 8 cylinder cars and 35 seconds on 6 cylinder cars.
    Drive 1 minute and 40 seconds at 40 m.p.h. between last fade and first recovery stop and between each recovery stop. Make 8 stops from 40 m.p.h. at 15 ft./sec.$^2$. Continue beyond 8 stops until stabilized if necessary.
    (*f*) 50 m.p.h. fade. Starting with brakes at ambient temperature, make 20 stops from 50 m.p.h. at 18 ft./sec.$^2$ at 25 second intervals between applications or until line pressure reaches 1400 p.s.i. on pedal. Immediately following last fade stop, run 40 m.p.h. recovery as in 2(*e*).
    (*g*) Spot check 30, 60 and 80 m.p.h. effectiveness curves. Make a stop at line pressure giving closest result to 15 ft./sec.² on each curve.

At first, the front braking torque was 39 percent greater than that of the rear, partly because of the 27 percent greater front wheel-cylinder area and partly because the brakes were not in balance after the preceding 70 m.p.h. fade and 40 m.p.h. recovery tests. In the test as represented in FIG. 12, the front braking torque decreased because of the greater fade caused by the increased heating. The two torque curves are symmetrical, as they must be when the total torque is held constant.

Similar tests were conducted on braking units wherein the front brake was provided with an aluminum-finned drum. Although the front brake often heated and faded during any one particular stop, it would cool down and recover between stops. As a result, the front brake in this test persistently developed more than its normal share of the torque and became heavily overloaded. After each of two such evaluations, the front linings were worn down to the rivets while the rear linings remained relatively unused. Such a condition could not develop in a single brake dynamometer test, but it is a real condition that does develop in a car.

FIG. 14 illustrates what happened when the two front brakes of a car were evaluated according to the same procedure utilized in the above-described tests. Although the two brakes are nominally identical, they develop differences in friction coefficent which cause the torque to transfer between the brakes. This illustrates the erratics encountered and noted by test car drivers. The erratics can be worse in a car, either because of torque transfer between the rear brakes being in phase with the torque transfer between the front brakes or because of the torque transfer from rear to front brakes.

Figure 15:
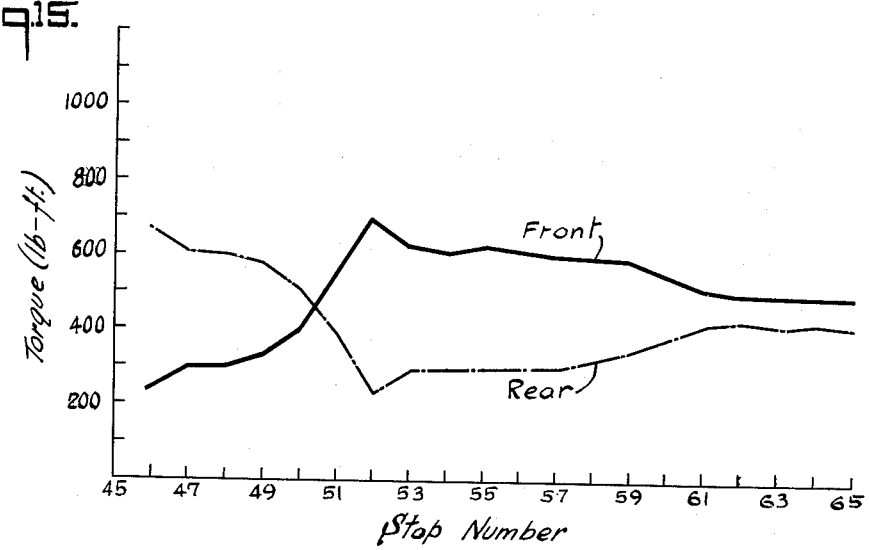
FIG. 15 is a chart illustrating the results during an evaluation made on the dynamometer of this invention of a series of run-in stops from 50 m.p.h. at 15 ft./sec.$^2$ of the right front and left rear brake linings of the same car evaluated in FIGS. 13 and 14.

FIG. 15 illustrates the symmetrical torque transfer that can occur between a right front and a left rear brake during part of the run-in test at 15 ft./sec.² from 50 m.p.h. according to the above-referred to C procedure.

Figure 17:
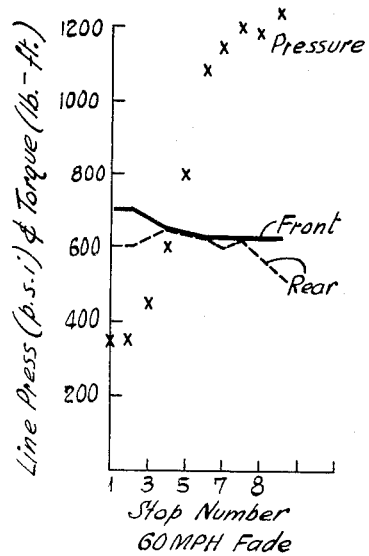
FIG. 17 is a chart similar to FIG. 16 illustrating the torque transfer during a second evaluation of the same brake linings as in FIG. 16.
Figure 18:
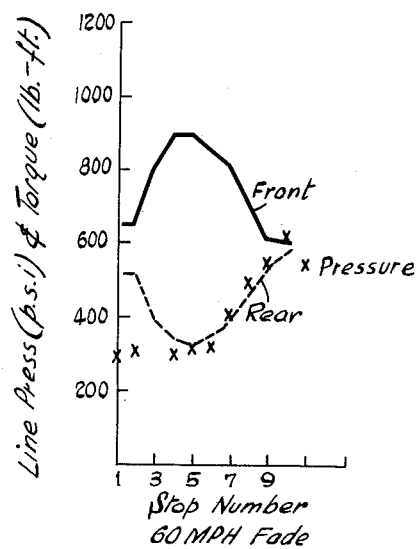

FIG. 16 illustrates the brake failure that results from low fade, probably combined with anti-fade. During the seecond evaluation of a test conducted according to an SAE procedure [1], at 60 m.p.h. at 15 ft./sec.², relatively little fade occurred, as shown by the less than two-fold rise in line pressure. The front brake became so heavily overloaded that the secondary lining was torn off. By contrast, as illustrated in FIG. 17, in the first evaluation of the same test the fade was so great that the total torque level could not be maintained, so no damage occurred.

The results point out the advantages of being able to simulate the actual test conditions performed on a test vehicle on a test stand dynamometer without the disadvantages attendant with test vehicles. Such disadvantages include introduction of extraneous variables, difficulty in mounting strain gauges, and the necessity to reinstall and recalibrate the strain gauges for each set of brakes being tested.

Additionally, due to the traffic hazards, speed laws, etc., expensive test tracks are required to conduct proper road tests. Furthermore, satisfactory road tests may only be conducted during favorable weather, whereas dynamometer tests may be conducted at any time.

The results produced during tests employing the dynamometer of the instant invention further indicate that the multiple brakes of a car or vehicle coupled to the same mass are dynamically unstable; the instability causes unpredictable variations in torque transfer which cannot be duplicated on a single brake dynamometer; fade causes periodic overloading and overheating of all the brakes; anti-fade may cause continuous overloading to the point of destruction of one of the brakes; torque transfer is caused by variation of the coefficient of friction between lining and brake drum, induced by heat and wear; and because of torque transfer, the four brakes of a car are rarely in balance.

It is to be understood that the form of the invention herewith shown and described is to be taken as a preferred embodiment of the same, but that various changes in the shape, size and arrangement of the parts may be resorted to without departing from the spirit of the invention or the scope of the subjoined claims.

What we claim is:

1. The process of off-road testing brakes, comprising: coupling a plurality of brake drums to a rotatable common test load mounted for rotation on a test stand; mounting a braking unit to be tested in cooperative association with each of the brake drums; rotating the test load, and exerting a braking force simultaneously to each of the brake drums through their respective braking units being tested under a relatively constant preselected pressure during a predetermined timed cycle to arrest the rotation of the test load during one portion of the testing procedure; and rotating the test load, and exerting a braking force simultaneously to each of the drums through their respective braking units being tested under controlled torque to maintain the sum of the torques exerted upon the brake drums at a substantially constant value to arrest the rotation of the test load during another portion of the testing procedure.

2. The process of off-road testing brakes, comprising: coupling a plurality of brake drums to a rotatable common test load mounted for rotation on a test stand; mounting a braking unit to be tested in cooperative association with each of the brake drums; rotating the test load, and exerting a braking force simultaneously to each of the brake drums through their respective braking units being tested under a relatively constant preselected pressure during a predetermined timed cycle to arrest the rotation of the test load.

3. The process of off-road testing brakes, comprising: coupling a plurality of brake drums to a rotatable common test load mounted for rotation on a test stand; mounting a braking unit to be tested in cooperative association with each of the brake drums; rotating the test load, and exerting a braking force simultaneously to each of the brake drums through their respective braking units being tested under controlled torque to maintain the sum of the torques exerted upon the brake drums at a substantially constant value to arrest the rotation of the test load.

4. A dynamometer for testing brakes comprising: a rotatable shaft; means for rotating said shaft; braking means for braking said shaft including a plurality of brake drums coupled to said shaft, a set of brakes to be tested for each drum, and a backing plate for and mounting each set of brakes; fluid pressure control actuating means for simultaneously actuating a plurality of said brakes into frictional engagement with said drums; and a torque measuring device for each brake drum sensing the torque exerted through the corresponding brakes when said brakes are actuated to arrest the rotation of said brake drums and of said shaft.

5. A dynamometer as described in claim 4, which further comprises means for graphically recording the individual torques measured by said torque measuring devices.

6. Apparatus as described in claim 4, which further comprises: means for controlling said actuating means to cause all of said brakes to be actuated in a manner whereby the sum of the torques exerted by said brakes is substantially constant during a test.

7. A dynamometer as described in claim 4, which further comprises means for controlling said actuating means to cause said brakes to be actuated under substantially uniform pressure during a test.

8. A dynamometer as described in claim 7, which further comprises means for visually indicating the fluid pressure being transmitted to said actuating means.

9. A dynamometer as described in claim 4, which fur-

---
[1] Ibid.

ther comprises a tachometer generator actuated by the rotation of said shaft and giving an indication of the rate at which said shaft is being decelerated when a braking force is being applied to said shaft.

10. A dynamometer as described in claim 9, wherein said means for rotating said shaft includes a motor and said tachometer generator gives an indication of the rate at which said shaft is decelerated when the power to said motor is discontinued and when a braking force is being applied to said shaft.

11. A dynamometer as described in claim 4, which further comprises first conduit means and a constant pressure regulator defining a constant pressure circuit connected to and providing a fluid under constant pressure to said actuating means; second conduit means, a fluid pressure booster, a comparator torque controller defining a constant torque circuit connected to said actuating means, said controller summarizing the values of the individual torques as measured by the torque measuring devices, comparing the sum with a preselected set point value, transmitting a signal representing the difference between said sum and said preselected set point value to said booster to suitably control the pressure through said constant torque circuit whereby the sum of the torques as measured by the torque measuring devices is maintained at a substantially constant value during the major portion of the braking cycle; and valve means for selectively operatively connecting either of said circuits.

12. A dynamometer as described in claim 11, which further comprises third conduit means, and a manually operated valve defining a manual circuit connected to and providing fluid under pressure to said actuating means, and valve means for selectively operatively connecting any one of the three circuits to said actuating means.

13. A dynamometer as described in claim 4, which further comprises air directing means directing an air flow adjacent each of said brake drums, and control means to regulate the volume of air flowing from said air directing means toward each of said brake drums.

14. A dynamometer for testing brakes comprising: a rotatable shaft; means for rotating said shaft; means for effecting a test load coupled to said shaft; braking means for braking said shaft including a plurality of brake drums, a backing plate for each of said drums, and a set of brakes to be tested for each brake drum; a torque lever arm for each of said brake drums and being coupled to the corresponding backing plate; a torque sensing device cooperatively engaged to each lever arm measuring the torque exerted by the brakes upon the corresponding brake drum when said braking means is actuated to simultaneously actuate a plurality of said sets of brakes to brake the rotation of said shaft; and transmitter means for each torque sensing device transmitting a signal indicative of the torque exerted upon the corresponding brake drum.

15. A dynamometer for testing brakes comprising: a rotatable shaft; means for rotating said shaft including a motor; braking means for braking said shaft including a plurality of brake drums coupled to said shaft, a set of brakes to be tested for each drum, and a backing plate for and mounting each set of brakes; fluid pressure control actuating means for actuating said brakes into frictional engagement with said drums; an angularly movable torque lever arm coupled to each of said backing plates; and a torque measuring device for each backing plate actuated by the angular movement of the corresponding lever arm when the corresponding backing plate, through the brakes mounted thereon, resists the rotation of said shaft and of said brake drums.

16. A dynamometer as described in claim 15, which further comprises means for recording the separate torque values as measured by the individual torque sensing devices.

17. A dynamometer for testing brakes comprising: a rotatable shaft having sufficient weight connected thereto to simulate a vehicle; means for rotating said shaft including a motor; braking means for braking said shaft including a plurality of brake drums coupled to said shaft, a set of brakes for each drum, and a backing plate for and mounting each set of brakes; fluid pressure controlled actuating means for actuating said brakes into frictional engagement with said drum; an angularly movable torque lever arm coupled to each of said backing plates; a torque measuring device for each backing plate actuated by the angular movement of the corresponding lever arm when the corresponding backing plate, through the brakes mounted thereon, resists the rotation of said shaft; uniform pressure control means connected to and for controlling said actuating means to cause the brakes to be actuated under substantially uniform pressure during a test; a constant torque control means connected to and for controlling said actuating means to cause all of said brakes to be actuated in a manner whereby the sum of the torques exerted by said brakes is substantially constant during a test; means for selectively and operatively connecting either of said uniform pressure control means and said constant torque control means to said actuating means; means for indicating visually the fluid pressure being transmitted to said actuating means; means for graphically recording the individual torques being applied at each of said brake drums; a thermocouple for each brake set positioned to sense the temperature of the brake lining; temperature indicating means coupled to and for each thermocouple to give a visual indication of the temperature as sensed by the corresponding thermocouple; a direct current generator driven by the rotation of said shaft and transmitting an electrical impulse; velocity indicating means for receiving an impulse from said direct current generator and translating said impulse into a visible indication of the velocity at which said shaft is being rotated; a decelerometer for receving an impulse from said direct current generator and translating said impulse into a visible indication of the rate at which said shaft is being decelerated when the power to said motor is discontinued and when a braking force is being applied to said shaft; an alternating current generator driven by the rotation of said shaft and transmitting an electrical impulse; revolution indicating means receiving an impulse from said alternating current generator and translating said impulse into a visible indication of the number of revolutions made by said shaft during a given time interval; an odometer receiving an impulse from said alternating current generator and translating said impulse into a visible indication of the linear distance a vehicle having brakes and brake drums corresponding to the brakes and brake drums being used in the test would travel during a given time interval; a recording counter counting the number of stops made by the shaft during a test series; an electrical circuit including a first timer controlling the time interval during which power is suppled to the means driving said shaft, and a second timer responsive to the elapsed time of said first timer and controlling the time interval between the stop of a time cycle and the start of the next subsequent time cycle of said first timer during a test series.

18. A dynamometer as described in claim 17 wherein said uniform pressure control means comprises first conduits means and a constant pressure regulator defining a constant pressure circuit providing fluid under constant pressure to said actuating means, and wherein said constant torque control means comprises second conduit means, a fluid pressure booster, a comparator torque controller defining a constant torque circuit, said controller summarizing the values of the individual torques as measured by the torque measuring device, comparing the sum with a preselected set point value, transmitting a signal representing the difference between said sum and said preselected set point value to said booster to suitably control the pressure through said constant torque circuit whereby the sum of the torque as measured by the torque measuring device is maintained at a substantially constant value during the major portion of the braking cycle, and valve means for selectively operatively connecting either of said circuits to said actuating means.

19. A dynamometer as described in claim 18 which further comprises third conduit means and a manually operated valve defining a manual circuit to provide fluid under pressure to said actuating means; and valve means for selectively operatively connecting any one of said three circuits to said actuating means.

20. A system for controlling the operation of a dynamometer simultaneously measuring a plurality of torque test loads, said dynamometer having a plurality of fluid actuated brake units for stopping the rotation of a common mass, comprising, in combination: conduit means through which a fluid is transmitted to the brake units to actuate the brakes and stop the rotation of the rotating mass; valve means in said conduit means; means for measuring the individual torques exerted at each of the brake units during braking of the rotating mass; means for transmitting separate signals, each representative of the individual torque as measured at the corresponding brake units; set point control means for controlling the total fluid transmitted through said conduit; means for summarizing the separate signals and comparing the sum with the set point index; means for transmitting a differential signal representative of the difference between said set point index and said sum; and means for varying a position of said valve in response to said differential signal to maintain a substantially constant sum of torques.

21. A dynamometer for testing brakes comprising: a rotatable test load; means for rotating said load; a plurality of brake drums coupled to said load; braking mechanism associated with said drums including a brake for each drum; means for simultaneously actuating the brakes of a plurality of said drums; and means for simultaneously measuring the individual torques transmitted by each of the drums being braked.

References Cited in the file of this patent
UNITED STATES PATENTS

| | | |
|---|---|---|
| 2,011,783 | Thomas | Aug. 20, 1935 |
| 2,070,022 | Morse et al. | Feb. 9, 1937 |
| 2,084,547 | Allen | June 22, 1937 |